(12) United States Patent
Foo et al.

(10) Patent No.: US 8,281,328 B2
(45) Date of Patent: Oct. 2, 2012

(54) DISC MOUNTING MECHANISM WITH FRONT AND REAR LOADING AND UNLOADING SLOTS

(75) Inventors: Kok Kin Foo, Singapore (SG); Chieng Hsiung Soo, Singapore (SG)

(73) Assignee: Digistore Solutions Holding Pte Ltd, Singapore (SG)

( * ) Notice: Subject to any disclaimer, the term of this patent is extended or adjusted under 35 U.S.C. 154(b) by 284 days.

(21) Appl. No.: 12/810,550

(22) PCT Filed: Dec. 28, 2007

(86) PCT No.: PCT/SG2007/000442
§ 371 (c)(1),
(2), (4) Date: Jun. 25, 2010

(87) PCT Pub. No.: WO2009/085010
PCT Pub. Date: Jul. 9, 2009

(65) Prior Publication Data
US 2010/0269126 A1 Oct. 21, 2010

(51) Int. Cl.
*G11B 7/24* (2006.01)
*G11B 23/03* (2006.01)

(52) U.S. Cl. ..................................... 720/620

(58) Field of Classification Search .............. 720/620, 720/633, 634, 641, 656; 369/30.38; 360/92.1
See application file for complete search history.

(56) References Cited

U.S. PATENT DOCUMENTS

| | | | | |
|---|---|---|---|---|
| 5,136,570 A | * | 8/1992 | Takai et al. | 720/624 |
| 5,195,077 A | * | 3/1993 | Ishikawa et al. | 720/623 |
| 5,337,304 A | * | 8/1994 | Hashi et al. | 720/618 |
| 2003/0099182 A1 | * | 5/2003 | Maeda et al. | 369/77.1 |
| 2006/0085810 A1 | | 4/2006 | Lin | |
| 2008/0235714 A1 | * | 9/2008 | Hasegawa et al. | 720/601 |

FOREIGN PATENT DOCUMENTS

| | | |
|---|---|---|
| JP | 2000-195066 | 7/2000 |
| JP | 2005-203018 | 1/2004 |

OTHER PUBLICATIONS

International Search Report dated Apr. 15, 2008 for corresponding International Application No. PCT/SG2007/000442.

* cited by examiner

*Primary Examiner* — Joseph Feild
*Assistant Examiner* — Gustavo Polo
(74) *Attorney, Agent, or Firm* — Duane Morris LLP

(57) ABSTRACT

An optical disc mounting mechanism, comprising, a front sweeper (32) for catching an optical disc from a front slot (12) and bringing said disc into a drive module followed by pushing an optical disc out of the front slot; a rear sweeper (34) for pushing the disc out of a rear slot (16) or catching the disc from the rear slot; one or more front sensors for sensing the insertion of an optical disc; a center sensor for sensing the present of the disc in a drive module; one or more rear sensors for sensing the moving direction of the disc; a drive head for reading or writing the disc; a controlling mechanism for mounting or unmounting an optical disc to said drive head (92). The said disc mounting mechanism has good adaptability and simple structures.

10 Claims, 6 Drawing Sheets

DISC MOUNTING MECHANISM WITH FRONT AND REAR LOADING AND UNLOADING SLOTS

FIELD OF THE INVENTION

The present invention relates to a field of optical drive for data storage or retrieval, more specifically, to a disc mounting mechanism.

BACKGROUND OF THE INVENTION

Multimedia programs are often stored on media, such as compact disc (CD), for running in a computer or other apparatus with a drive. Typically, the disc can be loaded into a drive and read by a reader inside the drive through a tray. The tray is triggered when a disc is sufficiently inserted and it moves backwards and forwards to eject and retract the disc. Usually there are internal mechanisms to control the movement of the tray, such as those disclosed in the U.S. Pat. No. 6,256,278 and US patent application 20060026611A1. However, all the related art references work in the same way: the user must locate the target disc and insert it into the drive. Then the drive can read and for write onto the disc or run the program. If the user has a large number of discs, it will be time consuming and bothersome to pick up the target disc and run it. Alternate approaches include the application of roller technology into the drive mechanism. However, rubber rollers which grasp the disc will be easily worn out and as such are inappropriate for applications beyond occasional consumer use.

There were also many technical solutions in the related art to handle this problem. US patent application 2005/0024996A1 provides circular support platters to hold discs and an external pick device with arm to efficiently pick the target disc from a large number of discs. U.S. Pat. No. 7,254,818 also provides a self aligning disc tray drive in which robot arm is used to pick a disc from a stack to move it into a tray assembly. The reference also discloses the use of a disc tray which also has a finished disc storage bin.

In all of the above applications, however, the disclosed mechanisms do not have good adaptability and have complex structures which can be more prone to mechanical failure over time.

SUMMARY OF THE INVENTION

The object of the present invention is to provide an unconventional way of disc insertion and retrieval process to save space and to have a higher device reliability while reducing the number of parts needed.

The presently claimed invention is a disc mounting mechanism comprising both front and rear slots for disc inserting. The mechanism has a front sweeper and a rear sweeper under the control of gears to catch and push the disc. The mechanism also has front sensors to detect the insert of the disc in the front slot, center sensor to detect the presence of the disc inside the drive module and rear sensors to detect the moving direction of the disc in the rear slot. The mechanism also has two drive plates holding a drive head and a magnet device for reading and writing the disc. The drive plates are controlled by two knobs. The movement of these knobs will further cause the movement of a disc drain which is used for the disc mounting and unmounting.

The advantage of the front and rear sensors is to ensure the position of the disc and enable firmware to accurate signals to the disc operation. The advantage of the disc drain is to align the disc to the right position between the drive head and the magnet device. During the mounting process, the disc will not be disturbed by human intervention and will assure the accuracy. The components of the mechanism above cooperate with each other to obtain a fluent and accurate result of disc mounting and overcome the disadvantages of the conventional drive.

DESCRIPTION OF THE PREFERRED EMBODIMENTS

Figure 1:
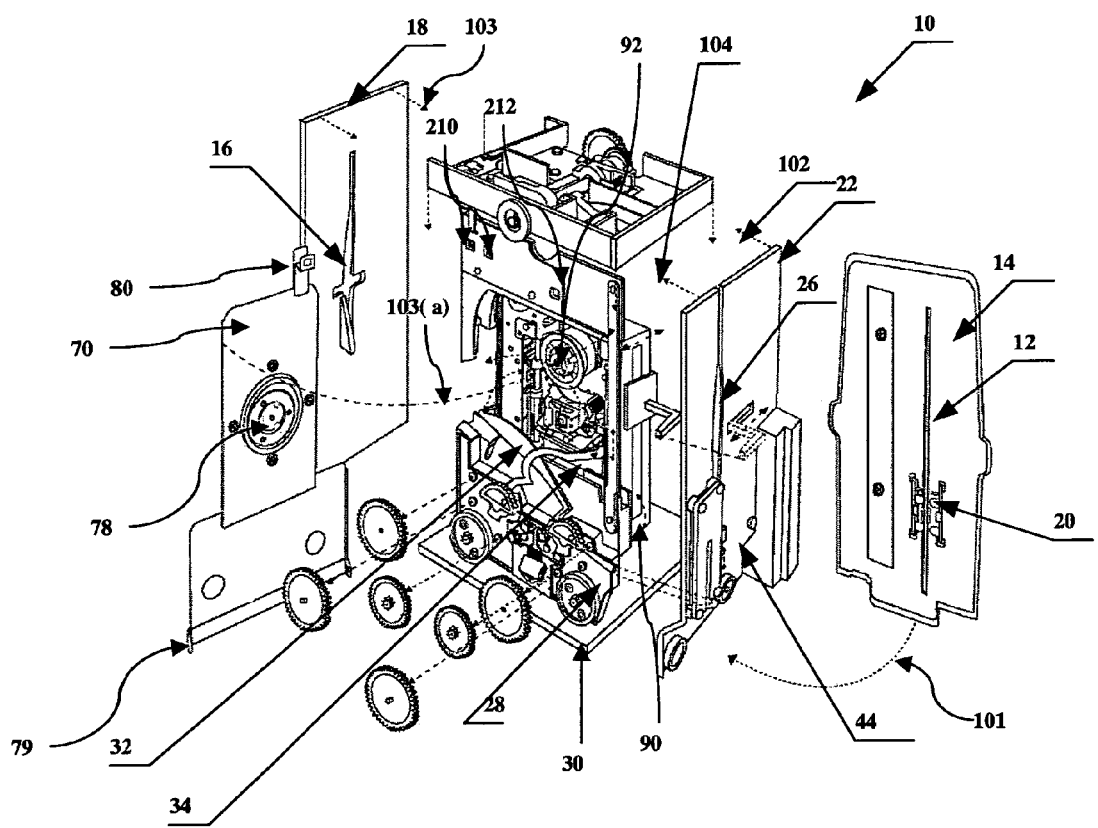
FIG. 1 is an exploded view of the disc mounting mechanism.

Referring to FIG. 1, the disc mounting mechanism 10 of the present invention as claimed is a box with two slots: the front slot 12 is on the right side cover 14 and the rear slot 16 on the left side cover 18. Inside the right side cover 14, front sensors 20 are arranged on the opposite sides of the front slot 12. The front sensors in one embodiment are infra-red sensors but could be any type of sensors which are able to detect the presence or absence of a disk. A slot 26 is arranged on the inner board 22 in consistent with the front slot 12. The right side cover 14 and the inner board 22 are attached to the mechanism 10 in the direction of arrow 101 and 102. The left side cover 18 is attached to the mechanism 10 in the direction of arrow 103. A supporting frame 28 is vertically arranged on the bottom 30. A front sweeper 32 and a rear sweeper 34 are separately arranged on the supporting frame 28.

Figure 2:
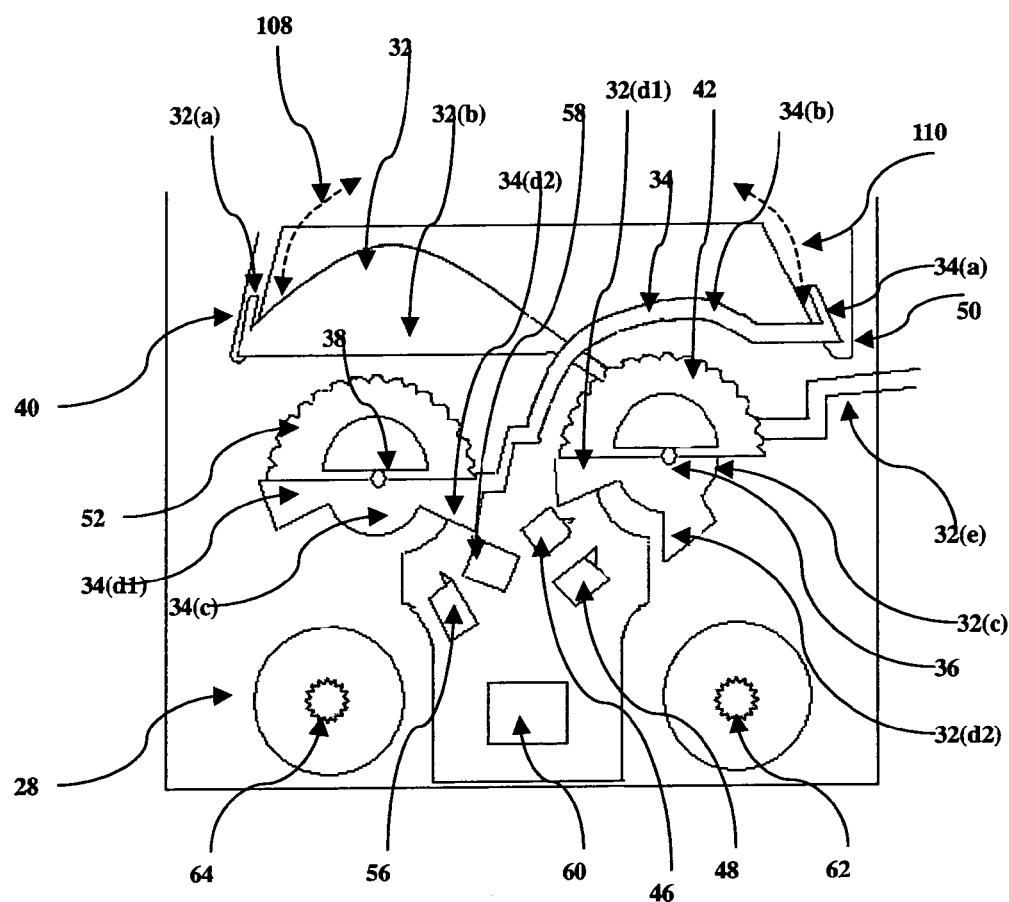
FIG. 2 is the front view of the front and rear sweeper mechanism.

In FIG. 2, the front sweeper 32 pivots on the shaft 36 and the rear sweeper 34 pivots on the shaft 38. The front sweeper 32 is a whole piece of sheet metal in a desired embodiment composed of a catch 32(a), an arm 32(b), a plate 32(c), two knobs 32(d1) and 32(d2) and disc stop arm 32(e). The catch 32(a) is a thin straight strip which is vertical to the supporting frame 28. When the front sweeper 32 is in its lowest position, the catch 32(a) is located in a narrow groove 40. The arm 32(b) has a curve shape and is connected to the end of the catch 32(a). The other end of the arm 32(b) is connected to a plate 32(c). The knobs 32(d1) and 32(d2) are separate sector-like projections on the plate 32(c). The plate 32(c) is connected to a half gear 42 with rivets (not shown). The half gear 42 is able to pivot on the shaft 36. As the relationship between the front sweeper 32 and the half gear 42 is fixed by the rivets, the rotation of the half gear 42 will cause synchronization rotation of the front sweeper 32 in the direction of arrow 108. Another thin strip called disc stop arm 32(e) is connected to the plate 32(c).

Continuing with FIG. 2, there are two micro switches 46 and 48 arranged on a PCB of the supporting frame 28 near the knobs 32(d1) and 32(d2). With the rotation of the front sweeper 32, the switches 46 and 48 can be switched by the knobs 32(d1) and 32(d2). The working processes will be discussed in detail below.

The rear sweeper 34 in a preferred embodiment is also a whole piece of sheet metal composed of a catch 34(a), an arm 34(*b*), a plate 34(*c*) and two knobs 34(*d*1) and 34(*d*2). The arrangement of the rear sweeper 34 is similar to that of the first sweeper 32. The catch 34(*a*) is a thin straight strip which is vertical to the supporting frame 28. When the rear sweeper 34 is in its lowest position, the catch 34(*a*) is located in a narrow groove 50. The arm 34(*b*) has a curve shape and is connected to the end of the catch 34(*a*). The other end of the arm 34(*b*) is connected to a plate 34(*c*). The knobs 34(*d*1) and 34(*d*2) are separate sector like projections on the plate 34(*c*). The plate 34(*c*) is connected to a half gear 52 with rivets (not shown). The half gear 52 is able to pivot on the shaft 38. As the relationship between the rear sweeper 34 and the half gear 52 is fixed by the rivets, the rotation of the half gear 52 will cause synchronization rotation of the front sweeper 34 in the direction of arrow 110.

There are two micro switches 56 and 58 arranged on the PCB of the supporting frame 28 near the knobs 34(*d*1) and 34(*d*2). With the rotation of the rear sweeper 32, the switches 56 and 58 can be switched by the knobs 34(*d*1) and 34(*d*2). The working processes will be discussed in detail below.

Micro switches 46 and 48 control the first motor (not shown) through a control circuit 60. The first motor is used to control the rotation and rotation direction of the axis of shaft 62. In a similar way, the micro switches 56 and 58 control the second motor (not shown) through the control circuit 60. The second motor is also used to control the rotation and rotation direction of the shaft 64. Each shaft of shafts 62 and 64 has a set of gears working together to finally control the movement of the front sweeper 32 and rear sweeper 34 through the half gears 42 and 52.

Returning to the FIG. 1, a first drive plate 70 is attached to the mechanism 10 in the direction of arrow 103(*a*) and is used for covering the supporting frame and the front and rear sweepers thereon. The first drive plate 70 is arranged between the inner board 22 and the left side cover 18 through a rod 79. A magnet device 78 is arranged on the inner side of the first drive plate 70 facing the sweepers. On the top of the first drive plate 70 attaches a connecter 80. The second drive plate 90 is at the back of the mechanism 10 and is attached between the inner board 22 and the left side cover 18 through another rod (not shown). There is a drive head 92 for reading and writing arranged on the second drive plate 90. Furthermore, there are a pair of rear sensors 210 and a center sensor 212 arranged on the upper portion of the mounting mechanism 10 between the drive plates 70 and 90.

Figure 3:
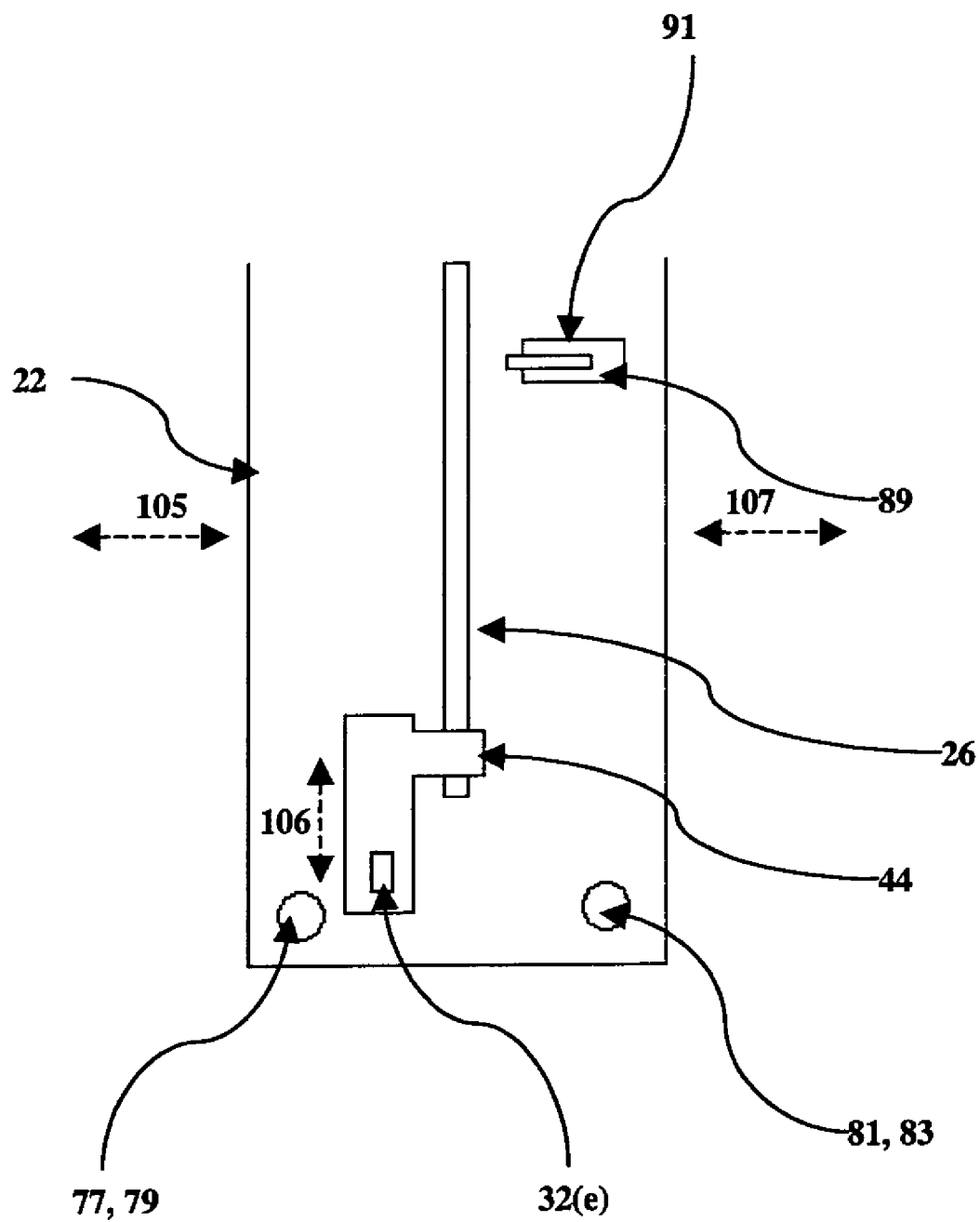
FIG. 3 is the left side view of the disc mounting mechanism without the right side cover 14.

Referring to the FIG. 3, the other end of the disc stop arm 32(*e*) mentioned above is connected to a disc stopper 44. The disc stopper 44 is able to move along the lower portion of the slot 26 in the direction of arrows 106. The rod 79 for the first drive plate 70 is arranged inside a hole 77 at the left bottom of the inner board 22. The rod 83 for the second drive plate 90 is arranged inside another hole 79 at the right bottom of the inner board 22. The first and second drive plates 70 and 90 are able to separately pivot on the rods 79 and 83 in the direction of 105 and 107. There is drive stopper 89 of a "L" shape attached to the second drive plate 90. The drive stopper 89 extends out of the inner board 22 through a slot 91. With the movement of second drive plate 90 along the arrow 107, the drive stopper 89 is able to block the slot 26. Optionally, the second drive plate 90 can have another drive stopper. The other drive stopper which has similar structure of drive stopper 89 is arranged facing the left side cover 18 for blocking the rear slot 16.

Figure 4:
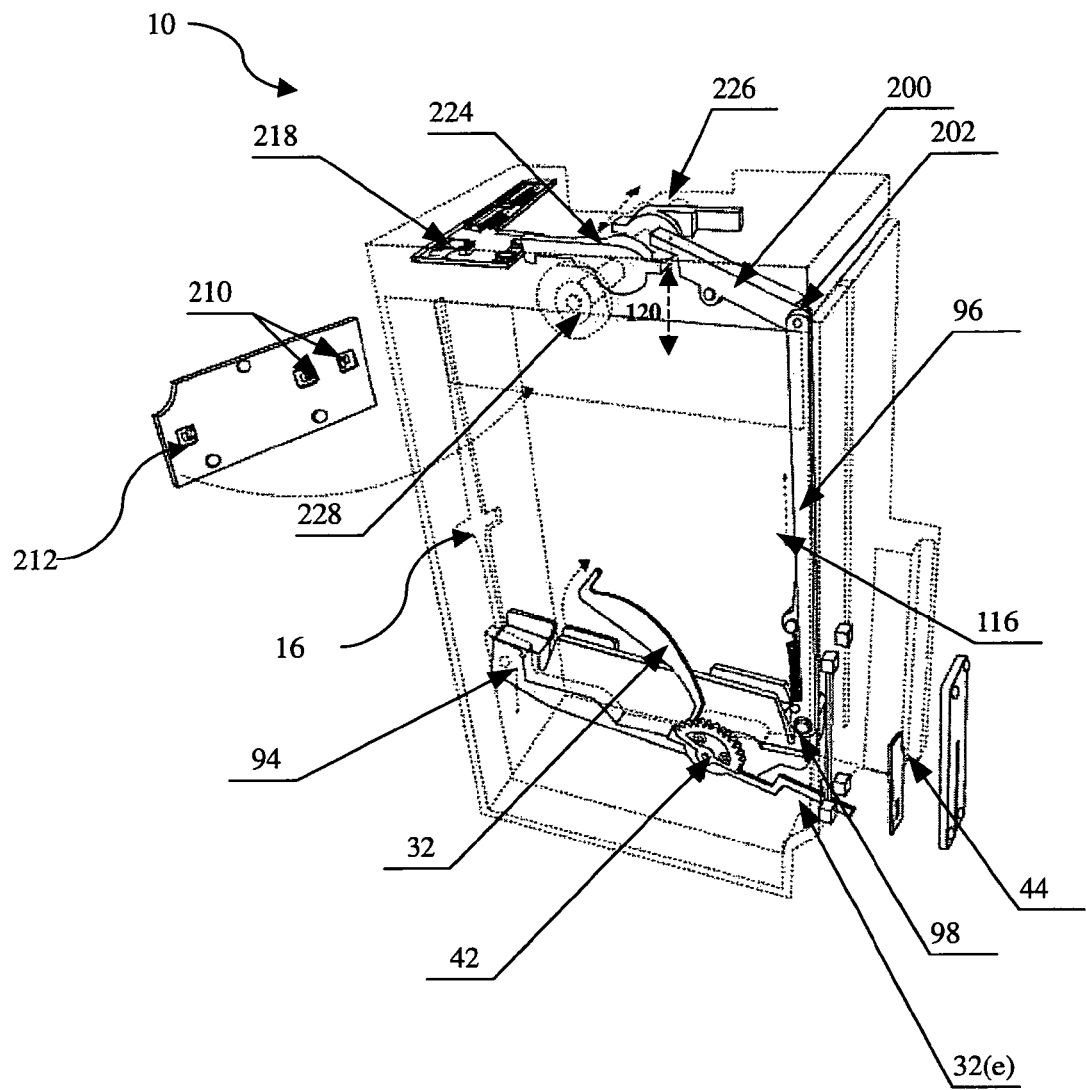
FIG. 4 is an exploded view of the disc knob, disc shaft, disc lever and disc drain.

Referring to the FIG. 4, there is a disc drain 94 for keeping the disc aligned between the first and the second drive plates (not shown). The disc drain 94 is a groove. Close to the front sweeper 32, the disc drain 94 is attached with a vertical drain lever 96 through an axis 98. The vertical drain lever 96 will move in the direction of arrow 116 under the control of the horizontal drain lever 200. The horizontal drain lever 200 is connected to the vertical drain lever 96 through an axis 202.

Figure 5:
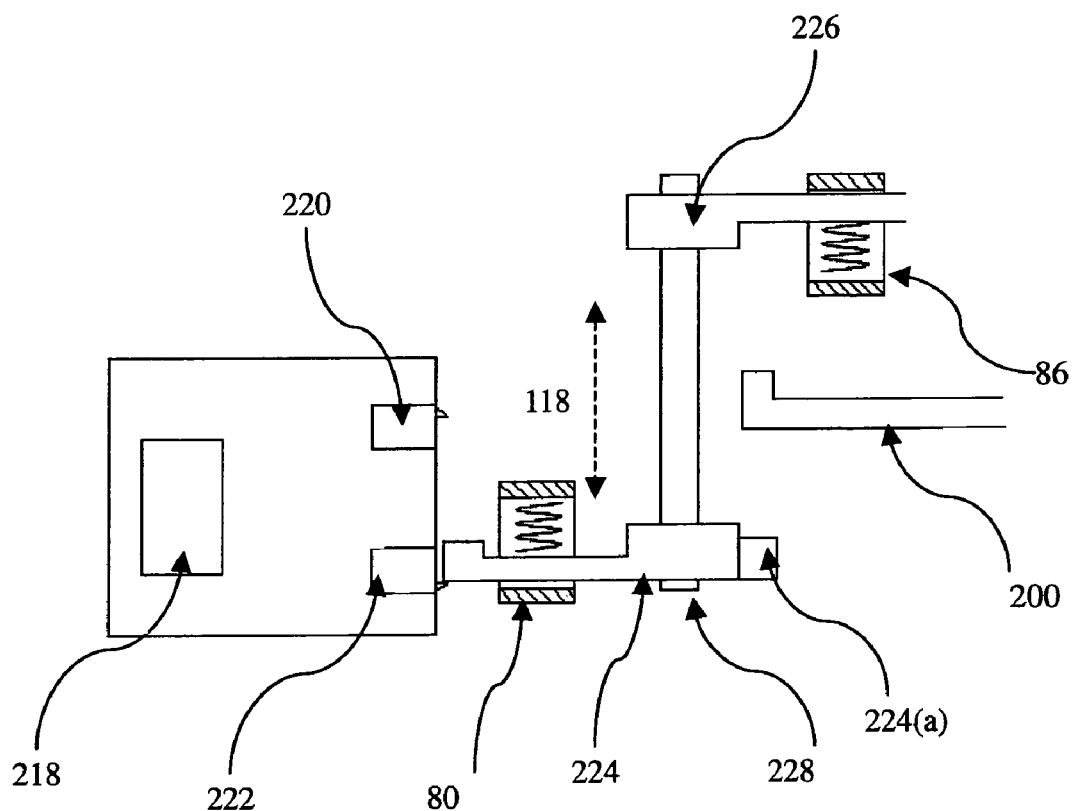
FIG. 5 is the top view of the disc knob, disc shaft, limit switches and disc lever.

Referring to FIG. 5, two drive knobs 224 and 226 are arranged opposite each other on the top of the mechanism 10. These two knobs 224 and 226 concentrically go through a drive shaft 228 and can move closely or separately in the direction of arrow 118 under the rotation of the drive shaft 228. Connector 80 of the front drive plate 70 is arranged close to the drive knob 224 and connector 86, which is attached to and can be simultaneously moved with the second drive plate 90, is arranged close to the drive knob 226. There are two switches 220 and 222 and a control circuit 218 arranged on the top of the mechanism 10 close to one drive knob 224. The switches 220 and 222 control the third motor (not shown) through the control circuit 218. The third motor is used to control the rotation of the drive shaft 228. The working processes will be discussed in detail below.

Retuning back to FIG. 4, when the knob 224 is approaching the knob 226, the wedged edge 224(*a*) of the knob 224 will be under the horizontal lever 200 and the said lever 200 will be raised in the direction of arrow 120. The raise of horizontal lever 200 will cause the drop of vertical lever 96 under the pivot of the axis 202. The disc drain 94 will thus be lowered by the horizontal lever 96.

The working procedure of the whole mechanism is as follow:

Drive Module Initialization

The purpose of this initialization process is to ensure that the drive module is always ready to use when the unit is powered up. During this process, all the discs are pushed back to the storage device and there is no disc in the drive module.

The initialization process starts 3 seconds after each time the power is on. The drive plates are checked first to assure they are opened. Later, the front sweeper is checked. The front sweeper 32 will be lowered if it is not at the lowest position. Next, the rear sweeper 34 is managed for two steps: raise the rear sweeper and then lower it.

After finishing the initialization process, the mechanism of this invention is ready for reading and writing. As the disc can be inserted both from the front slot 12 and the rear slot 16, the processes for inserting will be described separately.

Disc Insertion from Front

The purpose of this process is to insert a disc through the front slot 12 to read/write in the disc module.

Figure 6:
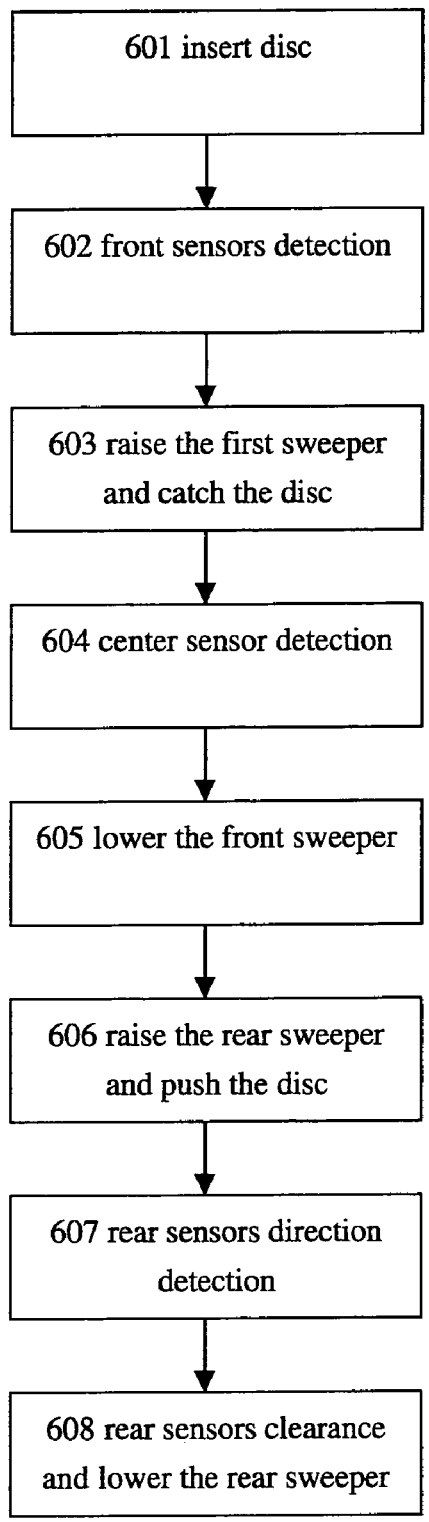
FIG. 6 is the flow chart of disc insert from front process steps.

Referring to the FIG. 6, in step 601, insert a disc into the front slot. When the disc is passing through the two sets of front sensors, in step 602, the front sensors can detect the presence of the disc. The front sensors are two sets of infra-red sensors. As mentioned above, the two sets of sensors are placed perpendicular to the disc. One of each set provides a constant infra-red beam and the other one works as the receiver. When the disc exists in front of the sensor, the infra-red beam is broken.

The first motor is used to control the rotation of the axis and through a series of gears to control the rotation of front sweeper. In step 603, after two sets of sensors detect the presence of the disc, the front sweeper raises until the knobs touches the switch to stop the rotation of the first motor and it can catch the disc which was inserted into the front slot. Incidentally, the disc stop arm of the front sweeper which is attaching to the drive stopper will be lowered to allow insertion of the disc into the drive module. The reason for arranging two sets of front sensors is to avoid misread signals. The disc has a round edge. If there is only one set of sensors, when the disc is rolling, it may break the constant beam and reactivate the front sensors again. Therefore, a misread signal is presented resulting wrong movements of the first sweeper. The front sensor will regard the rolling of the disc as an insert of new disc. The disc will be pushed back into the storage device (not shown). The whole mechanism is waiting for the next disc. Two sets of front sensors will be helpful to avoid such circumstance.

Then in step 604, the center sensor notices the present of the disc. The center sensor is made up of one set of infra-red sensor with one of it working as a sender of infra-red beam and the other working as a receiver. Due to the position of the center sensor, it is hard to misread the information. When the infra-red beam is broken, it usually means that one disc is present within the scope of the drive module. In step 605, the front sweeper is then lowered to place the media in the center of the drive module. At the same time, the drive stopper is raised to close the front slot. This is to ensure that when a disc is within the drive module, no other disc can be inserted into the drive module from the front.

In step 606, the rear sweeper rises to push the disc through the rear slot. The angle of the rear sweeper can be about 110° to ensure that the disc will be pushed out of the rear slot completely. Then in step 607, as the rear sensors are two sets of infra-red sensors, they are able to detect the moving direction of the disc. The switches and are used to stop the movement of the rear sweeper by knobs through the rotation of plate. In step 608, the clearance of both rear sensors indicates that the disc has already been moved from the disc module. The rear sweeper will be lowered to wait for the next instruction.

Disc Insertion from Rear

Disc insertion at the rear slot does not require the raise of the rear sweeper at the beginning as the inserted disc is completed in a "non-human intervention" condition. After the media is inserted into the rear slot, the rear sensors 210 will detect an opposite direction of the movement of the disc and then determine that the media is coming in from the rear. The disc rolls into the drive module and the center sensor detects the presence of the disc. The front sweeper then rises and pushes the disc out to the front slot. The angle of the raised front sweeper is about 45°, which is enough for the disc to protrude from the front slot 12. The disc is able to sit on the front slot 12 and can be picked by the user. The front slot sensor detects the presence of the disc at the front slot. After the disc is picked, the front slot sensor clears and then the front sweeper will be lowered. The disc will be waiting at the front slot for duration of 10 seconds. After that, if the disc hasn't been picked by the user, the front sensor will detect the presence of the disc again. The disc will then be retracted back into the storage device following the Disc Insertion from Front procedures.

Disc Mounting and Unmounting

If the disc needs reading or writing, then the next stage before the disc is pushed out from either the rear slot 16 or the front slot 12 will be mounting the disc to the drive. The center sensor 212 will be used to assure the existence of the disc as the center sensor 212 is located at the top portion of the mechanism. The center sensor 212 can only sense the signal when the disc is in the center. Firmware of the mechanism will provide a reading or writing signal to the third motor (not shown) to rotate the shaft 228. The shaft 228 will make the drive knob 226 and 224 moving toward each other in the direction of arrow 118. As mentioned before, the first drive plate 70 is attached to the drive knob 224 through the connector 80 and the second drive plate 90 is attached to the drive knob 226 through the connector 86. When these knobs 226 and 224 are close enough, the wedged edge 224(*a*) of the knob 224 will raise the horizontal drain lever 200 to cause further movement of the vertical lever 96. At last the disc drain is lowered to ensure the disc to be operated between the magnet device 78 and the drive head 92 in the right position. The lower of the disc allows the disc to spin freely when the disc is being operated. The rotation of the shaft 228 is controlled by the limited switches 222 and 220 through the movement of the knob 224. When the disc is operated between the magnet device 78 and the drive head 92, the first drive plate 70 and the second drive plate 90 are parallel.

When the disc is mounted between the first and second drive plates 70 and 90, the "L" shape drive stopper 89 will be moved together with the second drive plate 90 within the slot 91 to block the slot 26. The "L" shape drive stopper 89 is used to protect the disc while the drive head is operating on the disc and to prevent any damage to the disc and any interruption to the operation process. Optionally, another drive stopper will also be moved together with the second drive plate 90 to block the rear slot 16. Thus no further disc can be inserted into the slots 26 and 16 when the disc is read or written.

The unmounting process is similar to the mounting process. The difference only lies on the opposite moving direction of the knobs 224 and 226. The plates 70 and 90 are separated. As the plates 70 and 90 separately pivot on the rods 79 and 83, during the unmounting process, the side view of drive plates 70 and 90 present a shape of concave. The disc drain 94 is raised to move the disc out of the drive head 92 and the magnet device 78.

It will be appreciated that while only a few specific embodiments of the invention have been described herein for the purposes of illustration, various changes or modifications may be made without departing from the scope and spirit of the invention.

The invention claimed is:

1. An optical disc mounting mechanism, comprising,
   a front sweeper for catching an optical disc from a front slot and bringing said disc into a drive module followed by pushing an optical disc out of the front slot;
   a rear sweeper for pushing the disc out of a rear slot or catching the disc from the rear slot;
   one or more front sensors for sensing the insertion of an optical disc;
   a center sensor for sensing the present of the disc in a drive module;
   one or more rear sensors for sensing the moving direction of the disc;
   a drive head for reading or writing the disc;
   a controlling mechanism for mounting or unmounting an optical disc to said drive head.

2. A disc mounting mechanism of claim 1, wherein said front sweeper, said rear sweeper and said controlling mechanism are controlled by limit switches.

3. A disc mounting mechanism of claim 1, wherein said one or more front sensors, said center sensor and said one or more rear sensors are infra-red beam sensors.

4. A disc mounting mechanism of claim 1, wherein the controlling mechanism additionally comprises two drive knobs, a drive lever and a disc drain, in which said drive lever is mechanically connected to and moved by said drive knob and said disc drain is mechanically connected to and moved by said drive lever.

5. A disc mounting mechanism of claim 1, further comprising a plurality of drive plates, with said drive head arranged on a first drive plate and a magnet device is arranged on a second drive plate.

6. A disc mounting mechanism of claim 5, wherein said disc drain is positioned to raise an optical disk to the middle of said drive head and said magnet device and leave said optical disk between said drive head and said magnet device for operating.

7. A disc mounting mechanism of claim 1, further comprising a disc stopper under the control of said front sweeper to stop further insertion of disc.

8. A disc mounting mechanism of claim 1, further comprising one or more drive stopper under the control of said drive plate with said drive head which is positioned to stop an optical disc from pushing out when being read.

9. A disc mounting mechanism of claim 1, wherein the said front sensors are two sets of sensors to avoid misreading of the disc input signal.

10. A disc mounting mechanism of claim 2, wherein the said rear sensors are two sets of sensors to sense the direction signal of the disc moving.

* * * * *